May 28, 1963  J. F. COCHRAN  3,091,684
BRAZING APPARATUS
Filed July 13, 1961  2 Sheets-Sheet 1
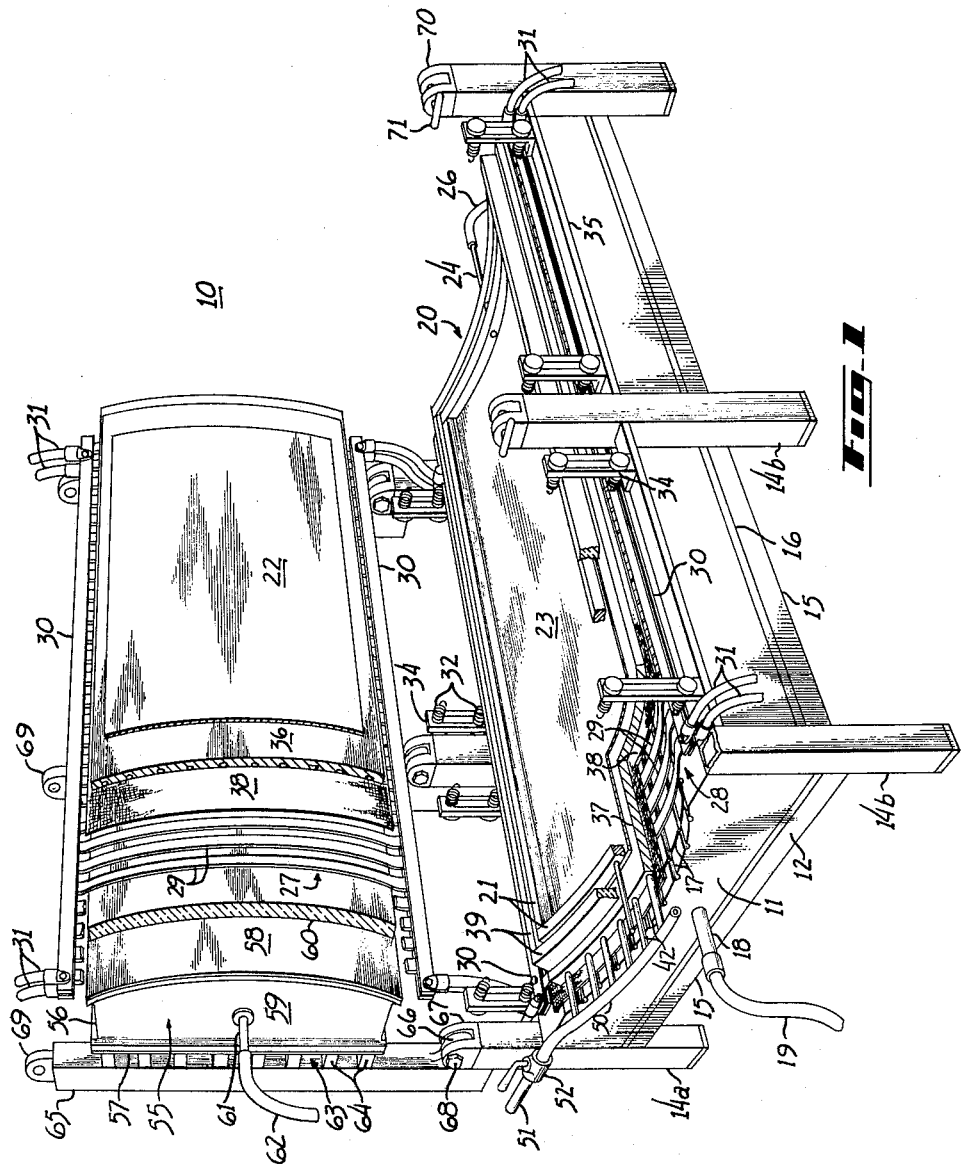
INVENTOR.
JOE F. COCHRAN
BY
ATTORNEY
AGENT May 28, 1963
J. F. COCHRAN
3,091,684
BRAZING APPARATUS
Filed July 13, 1961
2 Sheets-Sheet 2
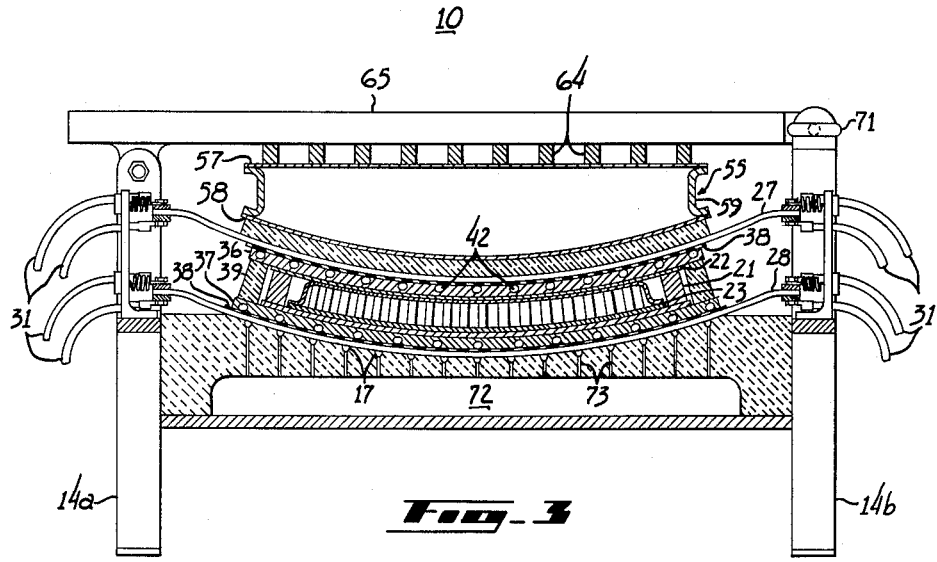
Fig_3
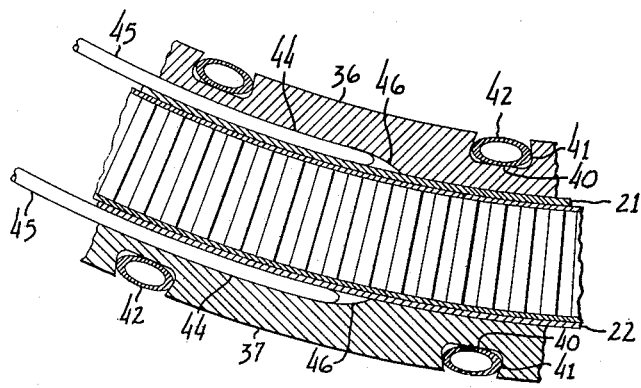
Fig_2
INVENTOR.
JOE F. COCHRAN
BY
ATTORNEY
AGENT 3,091,684
BRAZING APPARATUS
Joe F. Cochran, Fort Worth, Tex., assignor to General Dynamics Corporation, San Diego, Calif., a corporation of Delaware
Filed July 13, 1961, Ser. No. 123,794
1 Claim. (Cl. 219—85)

The present invention relates to an improved apparatus for the manufacture of brazed, composite structures.

It is generally accepted that the most efficient airframe design for high performance aircraft involves the use of structural components embodying the "sandwich panel" type construction. Sandwich panels are employed primarily as the external covering, or skin, of the aircraft, and each such panel typically consists of a low density, cellular core material, generally resembling a honeycomb in cross-section, disposed between a pair of relatively thin, metal, facing sheets, and peripheral edge members, which serve to facilitate attachment of the panel to the internal structure of the aircraft. In the past, because of the relatively low cruising speeds (less than Mach 2) of the aircraft on which they were installed, the panel components have generally been bonded together with organic adhesive materials having a temperature limitation of approximately 300° F. As a result of recent developments in aircraft propulsion technology, turbojet engines have been developed which are capable of propelling aircraft at sustained speeds of Mach 3 and above. At such speeds skin temperatures will reach approximately 1,000° F., thus exceeding the temperature limitation of the best adhesive materials and making it necessary that other means be employed in joining the components of the sandwich panels together. It has been found that brazing offers the best approach to the fabrication of sandwich panels having the temperature and strength characteristics required for Mach 3 flight.

In the fabrication of brazed, composite structures there are certain requirements which must be met in order to effect satisfactory brazed joints. Such requirements are especially stringent in the case of brazed, aircraft sandwich panels, because of the complex configuration of the panels, and because of the extreme mechanical and thermal stresses to which they will be subjected on the aircraft. The brazing alloys generally used are highly reactive at brazing temperature and combine readily with the oxygen in the atmosphere to form oxides, the formation of which results in weak joints and, consequently, unsatisfactory structures. Thus the structure must be enshrouded within an atmosphere of an inert gas (usually argon) during the brazing operation. As the temperature approaches the melting point of the brazing alloy, such alloy changes from a solid to a liquid state. In this latter state the alloy is subject to the forces of gravity and capillary attraction and will therefore flow, the amount of flow being determined by the brazing time, i.e., the time during which the temperature remains at or above the melting temperature of the brazing alloy. Normally a sandwich panel is brazed in a horizontal position with a layer of brazing alloy, in foil form, disposed between the core and each of the facing sheets. In this position the walls of the individual core cells extend in a substantially vertical direction. Under ideal conditions the brazing time is of such a duration as to permit the brazing alloy to flow toward the lines of intersection of the facing sheets and the cell walls, and along such walls in a vertical direction to form fillets at the cell wall-facing sheet junctures. However, if the brazing time is of too short a duration, the brazing alloy flow will be insufficient for proper fillet formation; and, conversely, if such duration is too great, the fillets will form and, as the flow continues, they will "unform," as it were, due to gravity, again resulting in improper fillet formation. It is thus apparent that the time-temperature relationship is of extreme importance in brazing operations, especially in the brazing of sandwich panels. It is also important that contact between the elements of the structure be maintained, since voids form at locations where the elements are not in contact.

In a conventional brazing operation the panel components are first assembled and placed between two thin metal sheets which are of slightly larger dimensions than the panel. The sheets are then welded together at their edges to form a flexible diaphragm enclosing the panel to be brazed. The diaphragm is provided with a fitting to which a vacuum pump may be attached. The diaphragm is next loaded into an airtight retort and after purging both of atmospheric contaminants, they are placed in a brazing furnace where the panel undergoes the appropriate brazing cycle. During the brazing cycle a vacuum is maintained on the diaphragm in order to assure proper contact between the parts. An inert gas, such as argon, flows through the retort such that should a leak develop in the diaphragm, the inert gas, rather than atmospheric contaminants, will be drawn thereinto. After brazing, the retort is removed from the brazing furnace and, since it is generally necessary to age the panel to obtain the desired physical characteristics, placed in a second furnace within which the proper aging temperature is maintained. When the aging cycle is finished, the retort is taken out of the aging furnace, opened and the diaphragm removed. The diaphragm is then cut open and the finished panel removed.

Several disadvantages are inherent in the above described process. The initial and operating costs of the furnaces involved is inordinately high. The expense is further increased by the slowness of the process, as well as by the use of a welded diaphragm which can be used only once. The retort is usually large and cumbersome, and therefore quite difficult to handle. The use of a retort also greatly increases the mass which must be heated in order to braze the panel components. In furnaces of the size required to accommodate the average panel, it is virtually impossible to obtain the precise time-temperature control necessary for brazing most high temperature metals. There is also no provision for controlling the cooling rate of the panel subsequent to brazing.

As distinguished from prior devices, the present brazing apparatus incorporates integral heating and cooling means which provide very precise control of the time-temperature relationships throughout the complete brazing cycle. In the subject apparatus the retort is eliminated, thus substantially reducing the mass which must be heated and cooled, which results in shorter heating and cooling times and, consequently, a faster production rate. The production rate is further increased by the elimination of the welded diaphragm. The present brazing apparatus is also well adapted for aging of the part subsequent to the brazing cycle. The atmosphere barrier herein employed affords better protection against atmospheric contamination than do prior devices. From the standpoint of economy the present apparatus is highly advantageous, since both the initial and operating expenses are substantially less than those of a conventional brazing furnace.

It is, therefore, the primary object of the present invention to provide an improved apparatus for the manufacture of brazed, composite structures.

Another object resides in the provision of an improved brazing apparatus in which the temperature of the composite structure being brazed may be precisely controlled at all times.

Another object of the invention is to provide an improved apparatus for the manufacture of brazed composite structures in which such structure may be aged subsequent to brazing.

Another object is to provide an improved apparatus for the manufacture of brazed, composite structures which permits a relatively high production rate.

Another object of the invention is the provision of an improved brazing apparatus for the manufacture of brazed composite structures which is simple and economical to operate.

These and other objects and advantages will be more apparent from the following description of the appended drawings wherein the preferred embodiment of the invention is illustrated, and in which:

FIGURE 1 is a perspective view of the apparatus in which certain portions are cut away for clarity;

FIGURE 2 is an enlarged cross-sectional view of a portion of the apparatus illustrating the cooling system of the apparatus;

FIGURE 3 is a transverse sectional view through the apparatus showing a typical sandwich panel positioned therein.

Referring now to FIGURE 1 of the drawings, the brazing apparatus of the present invention, generally indicated by the numeral 10, includes a base block 11 formed to the contour of the panel to be brazed and supported upon a table 12 comprising vertical legs 14 and horizontal members 15 interconnecting such legs. The base block is preferably composed of a high temperature ceramic material, which may be cast from a plaster mold, thus simplifying the initial tooling operations. A reinforcing plate 16 is employed on the underside of the block. On the upper surface of the block longitudinal and transverse grooves 17 are formed, the purpose of which will be explained below. A conduit 18 is connected with the interior of the base block which, as will be seen, is hollow. Such conduit is, in turn, connected with an air pump (not shown) by means of a flexible hose 19.

In order to prevent atmospheric contamination, the panel being brazed, or work piece which for the sake of clarity is not shown in this view, is enclosed within an atmosphere barrier 20 defined by a peripheral frame 21, the dimensions of which are slightly greater than the corresponding dimensions of the panel, an upper sealing sheet 22 and a lower sealing sheet 23. The barrier elements are composed of a high temperature metal, such as one of the stainless steel alloys, in order that they may withstand repeated heating and cooling without appreciable warping or deformation. The frame 21 is provided with an inlet fitting 24, and an outlet fitting 25, the former being connected to an inert gas source (not shown) by means of conduit 26.

The heat for brazing is provided by upper and lower electrical resistance heaters 27 and 28, respectively. Each such heater includes a plurality of spaced, transverse strips 29 of a suitable high resistance material, such as a nickel-chrome alloy. At their ends the heater strips are restrainedly disposed between bus bars 30 to which are connected electrical cables 31 which, in turn, are connected to a suitable source of electrical power (not shown). The power supply is preferably a two channel, low voltage, high current unit provided with a temperature-sensitive control for each channel, of a type well-known to the art. As will be seen, thermocouples are employed to control the operation of the power supply. As the temperature increases during brazing, considerable elongation of the heater strips occurs. In order to prevent bending of the strips, tension springs 32 are employed in conjunction with each of the heaters. Such springs are fastened at one end to the bus bars 30 and at their opposite ends to brackets 34 affixed to supporting bars 35 extending between the legs 14. Thus as the strips elongate, the slack is taken up by the springs. A suitable dielectric material is employed to insulate the springs from the bus bars.

In order to assure equal heat distribution upon the panel, heat transfer plates 36 and 37 are positioned respectively, between upper heater 27 and upper sealing sheet 22 and between lower heater 27 and lower sealing sheet 23. The plates are of a relatively heavy gage and fabricated of a material, such as copper, having good heat transfer characteristics. Each of the plates 36 and 37 are separated from the adjacent heaters 27 and 28, respectively, by means of a sheet 38 of high temperature dielectric material, such as leached silica cloth. Heat loss through the edges of the panel is minimized by positioning a frame 39 of insulating material around the barrier 20.

The heat transfer plates 36 and 37 also serve as a means of cooling the panel when brazing is complete. As shown in FIGURE 2 a plurality of spaced parallel grooves 40 are formed in the upper surface of upper plate 36 and in the lower surface of lower plate 37. The side walls 41 of such grooves converge slightly toward the surface of their respective plate. An appropriate length of round copper tubing 42 is placed within each of the grooves and pressed thereinto until its outer surface is substantially flush with the surface of the plate. As a result, the cross-section of the tubing is changed into an elliptical configuration, the lateral edges of the tubes exerting a force against the sides of the grooves, thereby locking the tubes firmly in place. The tubes 42, so positioned within the heat transfer plates, provide passages through which a coolant fluid, such as air, water or a liquefied gas, may be circulated when cooling of the panel is desired.

FIGURE 2 also serves to illustrate the manner in which thermocouples may be positioned adjacent the panel to control the temperature thereof. At selected locations small grooves 44 are cut in the surfaces of heat transfer plates 36 and 37 adjacent the panel into which grooves sword type thermocouples 45 are inserted. The ends of the grooves slope gradually toward the panel as at 46, such that as the ends of the thermocouples approach the ends of the grooves, the thermocouples are forced into positive contact with upper and lower sealing sheets 21 and 22, respectively, enclosing the panel, thus assuring an accurate indication of the panel temperature. It is desirable that such thermocouples be used in pairs, i.e., one above and one below the panel at each location. In this manner uniform heating of the panel is assured.

Referring again to FIGURE 1, the coolant tubes 42 through lower heat transfer plate 37 extend outward therefrom and are connected to a manifold 50. A similar manifold arrangement (not shown) is employed in conjunction with the upper heat transfer plate 36. Such manifolds are connected, in turn, with a pressurized coolant source through flexible conduits 51. In the brazing and subsequent aging of most metals, several different cooling rates are involved. Moreover, it frequently occurs that, as a result of differences in insulation above and below the panel, there is a disparity between the heat loss rates through the upper and lower surfaces of the panel. Thus, in order to provide a means of varying the cooling rate of the panel and of compensating for the differences in heat loss rates, a variable-flow valve 52 is positioned between each of the manifolds and the coolant source.

During the brazing operation, contact between the panel elements is maintained by means of an inflatable, air-tight pressure vessel 55. Such a vessel includes a rigid metal frame 56 over the upper and lower surfaces of which are welded thin, flexible metal sheets 57 and 58 respectively. The end members 59 of the frame are formed with a curved lower edge, such that the curvature of the lower surface of the vessel approximates that of the panel being brazed. In order to prevent damage to the pressure vessel as a result of heat from the upper heater 27, a relatively thick sheet 60 of insulating material, such as leached silica cloth, is positioned therebetween. The vessel is provided with a fitting 61 communicating with the interior thereof, to which a pressure source is connected by means of a flexible hose 62. A grid 63 is employed adjacent the upper surface of the vessel and serves to reinforce the upper sheet component 57 thereof. The grill consists of a plurality of spaced bars 64 extending substantially the length of the vessel 55. The grid 63 is preferably fixedly attached, as by welding, to beams 65 which extend transversely across the top surface of the grill. Near one end of each of the transverse members a tongue 66 is provided which extends perpendicular to the length of the member and is disposed within a clevis 67 at the upper end of each of the adjacent legs 14a of table 12. Pins 68 are employed to pivotally interconnect the tongues and clevises, thereby providing an axis about which the transverse beams may be rotated. At the opposite end of each of such beams another tongue 69 is provided which extends along the length of the member. Such tongues 69 are adapted to fit within clevises 70 at the upper ends of legs 14b. As will be seen, with the brazing apparatus in the closed position, removable pins 71 are inserted through tongues 69 and clevises 70 to secure the transverse members in a fixed position relative to the legs 14 and to the panel being brazed.

Pressurization of the vessel 55 forces the upper and lower sheets 57 and 58, respectively, to move in opposite directions, i.e., the lower sheet flexes downwardly and the upper sheet flexes upwardly. However, the upper sheet 57 is prevented from actual upward movement by the grid 63 which is directly restrained by the transverse beams 65 and legs 14. Thus upward flexure of the upper sheet results in a downward movement of the pressure vessel frame 56 relative to the beams 65. The total downward movement of which the lower sheet 58 is capable is therefore the sum of its own downward movement plus the downward movement of the frame resulting from upward flexure of upper sheet 57.

In order to understand the significance of the above described construction of the pressure vessel and the movements of the upper and lower sheets thereof under pressurization, it must be realized that such sheets are necessarily composed of a metal or metal alloy capable of withstanding very high temperatures. Such materials generally have a high modulus of elasticity. Flexure of the sheets involves an elongation thereof in both longitudinal and transverse directions. With the pressures normally employed, the elongation and the flexure of the sheets are comparatively small. The relative movement of the sheets, i.e., the total downward movement of the lower sheet, is similarly small, generally only a few hundredths of an inch. In many instances the downward movement of the lower sheet alone is insufficient to apply the pressure required to maintain the proper contact between the elements of the panel being brazed. It is thus seen that downward movement resulting from flexure of the upper sheet is needed to assure proper contact during brazing.

In order to simplify the use of the present apparatus, it is desirable that the pressure vessel 55 be attached to the grid 63 and, consequently, to the transverse beams 65. In this manner the pressure vessel is carried by the transverse members and may, therefore, be rotated upwardly along with the latter during loading and unloading of the panel. Such attachment may be effected in any suitable manner, such as by welding the upper metal sheet 57 to the bars 64 at spaced intervals therealong. It is to be noted that the frame of the pressure vessel is not attached to the bars, as this would decrease the total downward movement of the lower sheet.

A typical operation with the present apparatus involves the brazing of a sandwich panel, the elements of which may be, exemplarily, composed of 17–7 precipitation hardening, stainless steel. The panel elements are first cut to size and formed to the desired contour. The parts are next thoroughly cleaned. The cleaning operation is particularly important in obtaining satisfactory brazed joints, since any foreign material adhering to the elements will usually cause voids, or areas where brazing does not take place. The following has proven to be a satisfactory cleaning procedure for stainless steel alloys. If the parts are covered with a heavy coating of oil or grease, they are first degreased in a conventional degreasing tank. They are then cleaned in an alkaline detergent solution, after which they are thoroughly rinsed in tap water. The parts are next placed in a room temperature acid bath consisting of (by volume) 18–22% sulfuric acid, 8–12% nitric acid, 1.0–2.5% hydrofluoric acid and 1.0–1.5 oz. (per gallon) sodium dichromate, for 10 to 20 minutes, after which they are again rinsed in tap water in the manner already described. The parts are then spray-rinsed with distilled or de-ionized water and allowed to dry. The brazing foil, a silver-copper-lithium alloy, is similarly cleaned. When the cleaning operation is complete the parts must be handled in such a manner as to prevent recontamination; for example, all personnel handling the parts should wear clean cotton or rubber gloves. If the parts are not to be brazed immediately they should be wrapped in fresh wrapping paper.

After cleaning, the panel elements are assembled with a sheet of the brazing foil disposed between all surfaces where brazing is desired. At surfaces wherein adhesion is undesirable a suspension of powdered aluminum may be brushed on to prevent brazing. The elements are then tackwelded together at selected locations on the panel to prevent shifting of the elements during brazing. The panel is next placed within the barrier 20 which has been removed from the rest of the brazing apparatus. Both the barrier and the panel are then placed within a purging chamber (not shown) which is merely a shallow, airtight container having a removable cover. At one end the interior of the container is connected with a pressurized argon source and at its opposite end with a vacuum pump. The panel and barrier are then purged of atmospheric contaminants by first pulling a vacuum on the chamber, and then filling the chamber with argon. This cycle is repeated approximately ten times. When the purging operation has been completed, the barrier and panel are removed from the chamber and immediately placed upon the lower heat transfer plate 37. The conduit 26 is connected with inlet fitting 24 and the flow of argon through the barrier is initiated. Insulation frame 39 is next placed around the barrier and upper heat transfer plate 36, dielectric sheet 38, upper heater 27 and insulation layer 60 are placed thereupon. Then the pressure vessel 55 is rotated downwardly into position and pins 71 are inserted through tongues 69 on transverse beams 65 and clevises 70 on legs 14b, thereby securing the pressure vessel in place as shown in FIGURE 3. The thermocouples 45 are inserted adjacent the barrier and the vessel 55 is pressurized, thereby forcing the upper and lower sealing sheets 22 and 23, respectively, against the barrier frame 21, as well as forcing the panel elements into contact with each other. It is to be noted that the barrier components are not connected together in any way, but are merely in contact with each other. Moreover, it is not necessary that their contact form an airtight seal. The contaminants in the surrounding atmosphere are prevented from entering the barrier by maintaining a slight positive gas pressure within the barrier by adjusting the flow of argon therethrough. Thus at points around the periphery of the barrier where the seal between the components is not airtight, argon will flow out of the barrier, thereby precluding the influx of air. As may be readily seen, the present atmosphere barrier not only eliminates the necessity for a welded diaphragm, but affords greater protection for the panel as well. This feature constitutes one of the major advantages of the present brazing apparatus.

Heating of the panel is now begun by initiating operation of the electrical power supply. As disclosed above, the electrical power supply has two independent channels, each having a separate thermocouple control system. One of the channels, along with the corresponding control system, supplies the upper heater 27, the other channel supplying the lower heater 28. The control systems are synchronized such that a uniform temperature throughout the panel may be maintained at all times.

The panel is heated to a temperature of 1650° F. which is slightly above the melting temperature of the brazing alloy. Such temperature is maintained for a period of five minutes to allow the brazing alloy to flow and form fillets. At the end of this period the power supply is shut off and the brazing cycle proper is complete. The aging cycle is now begun. To age the panel the temperature thereof is first reduced to 1450° F. at a rate of 35° F. per minute. Such cooling is accomplished by flowing liquid nitrogen through the tubes 42 in heat transfer plates 36 and 37. The flow rates through the respective plates are adjusted to obtain uniform cooling of the plates in the manner described above. When this temperature (1450° F.) has been obtained, the panel is further cooled to 1250° F. at a rate of 8° F. per minute. This slower cooling rate may be accomplished merely by reducing the flow of liquid nitrogen, or for purposes of economy, it may be accomplished by circulating air into a plenum chamber 72 within base block 11 through air hose 19 and fitting 18 (described above in conjunction with FIGURE 1), thence through passages 73 connecting the plenum chamber with grooves 17 on the upper surface of the base block 11. Such air absorbs heat from the lower heat transfer plate 37, flows out of the grooves 17, and dumps the heat in the surrounding atmosphere. Another alternate method of cooling the panel is to circulate water or air, in place of liquid nitrogen, through the heat transfer plate passages.

After cooling to 1250° F. the temperature of the panel is further reduced to a maximum of 60° F. at the rate of 35° F. per minute. This is best effected through the use of liquid nitrogen in the manner already described. The panel is again heated, this time to 1050° F., which temperature is held for thirty minutes. At the end of this period, the aging cycle is complete. The panel is then cooled to room temperature, by one of the methods mentioned above, and removed from the brazing apparatus.

After brazing it is desirable to inspect the panel for dimensional correctness and also for possible voids. The latter is best accomplished by means of X-ray techniques.

Structures brazed in the present brazing apparatus are of consistently high quality, having good adhesion characteristics between brazed surfaces and exceptionally high strength properties.

As will be apparent to persons skilled in the art, numerous modifications of the present device are possible. For example, in place of an inflatable pressure vessel a second cast ceramic block, appropriately contoured, may be positioned upon the panel, the weight of such block serving to maintain the required contact between the panel elements and the atmosphere barrier components. Numerous other modifications are also possible.

While only the preferred embodiment of the invention has been shown and described herein, it is to be understood that the invention is not limited to such embodiment, as many variations may be made without departing from the scope of the invention as defined in the following claim:

What I claim is:

An apparatus for fabricating a composite structure formed of component elements adapted to be brazed together by means of a suitable brazing material, said apparatus comprising, in combination, a barrier for enclosing said structure, said barrier including a peripheral frame member, an upper sealing sheet member positioned upon said frame and said structure and a lower sealing sheet positioned beneath said frame and said structure, means associated with said barrier for circulating an inert gaseous medium through said barrier and about said structure to protect said structure against atmospheric contamination, a base block for supporting and maintaining the contour of said structure, said base block being formed with a network of grooves on its upper surface and a plenum chamber within its interior, said plenum chamber being connected with said grooves through a plurality of passages, said plenum chamber also being connected with a source of coolant fluid, whereby said coolant fluid may be circulated through said plenum chamber, said passages and said grooves, means for exerting pressure against said structure and said barrier for maintaining positive contact between said structural elements and between said barrier members, said pressure means including an inflatable vessel expansible in a direction perpendicular to the surface of said structure and restraining means positioned adjacent said vessel for preventing movement of said vessel away from said structure, electrical resistance heating elements disposed adjacent said upper and lower barrier sheet members for heating said structure to the melting point of said brazing material, said heating elements being connected with a suitable source of electrical power, temperature-sensitive means associated with said power source and positioned adjacent said barrier sheets for controlling the temperature of said structure, and means for equally distributing the heat from said heating elements onto said structure, said heat distribution means including a relatively heavy plate of a material having high heat-transfer characteristics disposed between each of said upper and lower barrier sheet members and said heating elements.

References Cited in the file of this patent

UNITED STATES PATENTS

| | | |
|---|---|---|
| 2,693,636 | Simpelaar | Nov. 9, 1954 |
| 2,783,363 | Gunther et al. | Feb. 26, 1957 |
| 2,984,732 | Herbert | May 16, 1961 |
| 3,011,926 | Rowe | Dec. 5, 1961 |

FOREIGN PATENTS

| | | |
|---|---|---|
| 551,841 | Belgium | Nov. 14, 1956 |